United States Patent [19]

Berler

[11] 4,432,912
[45] Feb. 21, 1984

[54] FOOD PROCESSOR WITH AIR WHIPPING CAPABILITY

[76] Inventor: Robert M. Berler, 3 Bruce La., Westport, Conn. 06880

[21] Appl. No.: 343,671

[22] Filed: Jan. 28, 1982

[51] Int. Cl.³ ............................................... B01F 3/04
[52] U.S. Cl. ..................................... 261/93; 261/124; 261/DIG. 16; 366/102
[58] Field of Search ............... 366/101, 102, 103, 104, 366/106, 107; 99/348; 261/93, 124, DIG. 16

[56] References Cited

U.S. PATENT DOCUMENTS

| | | | |
|---|---|---|---|
| 1,852,267 | 4/1932 | Roush | 261/121 R |
| 1,922,749 | 8/1933 | Roush | 261/122 |
| 1,964,345 | 6/1934 | Feller | 261/DIG. 16 |
| 2,074,597 | 3/1937 | Stark | 261/121 R |
| 2,193,934 | 3/1940 | Moores | 261/121 R |
| 2,603,465 | 7/1952 | Malzacher | 261/121 R X |

FOREIGN PATENT DOCUMENTS

| | | | |
|---|---|---|---|
| 775618 | 1/1935 | France | 261/DIG. 16 |
| 831257 | 8/1938 | France | 261/DIG. 16 |
| 195285 | 4/1938 | Switzerland | 261/DIG. 16 |
| 511871 | 8/1939 | United Kingdom | 261/DIG. 16 |

*Primary Examiner*—Robert W. Jenkins
*Attorney, Agent, or Firm*—Arthur J. Plantamura

[57] ABSTRACT

An improved food processor kitchen appliance is disclosed which possesses the capability of whipping cream, egg whites, and the like under relatively mild conditions that do not degrade the food product being processed. The invention resides in a modified food processor which includes: a special bowl, sometimes referred to as an air bowl, which may be readily substituted for the conventional bowl and into which low pressure air may be admitted; means to supply a source of air to be fed into the bowl through the bottom of the bowl; means for controlling the stirring whisk attachment mixing speed; and means for monitoring the admittance of air into the food product to be whipped. The act of placement of the air bowl on the base functions to control suitable electrical switches which in turn control devices which alter gear ratios between the drive motor and the drive shaft to a lower than conventional gear ratio, thereby reducing the rotational speed for the food whipping cycle. At the same time, the gear train between the drive motor and the air pump is engaged, resulting in providing a supply of air into a chamber beneath the bowl and then into the bowl through holes formed in the bottom of the bowl. Suitable controls for manually or automatically starting and stopping or interrupting the air feed and/or stirring whisk are provided to allow whipping action to be started or stopped in a variety of desired performance cycles.

9 Claims, 10 Drawing Figures

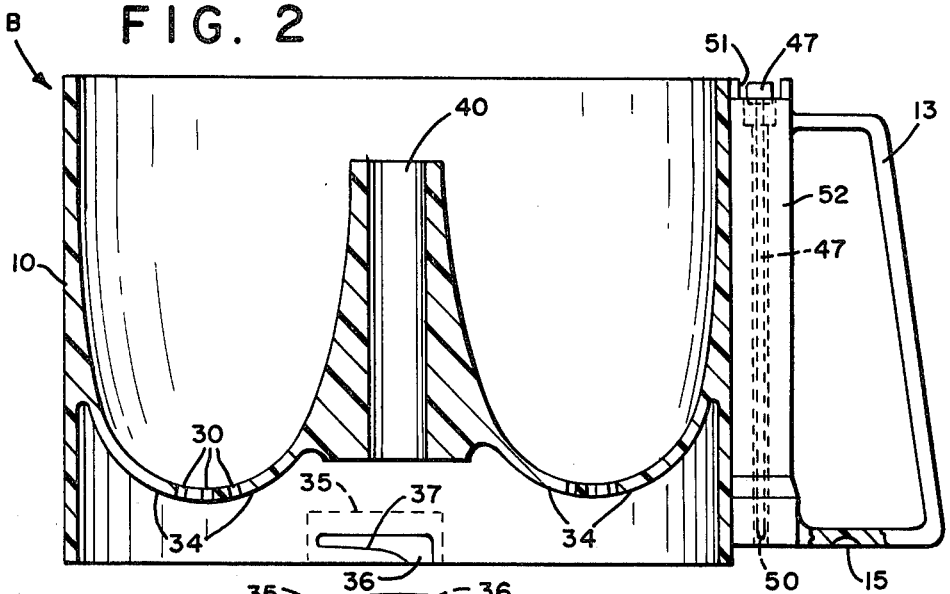
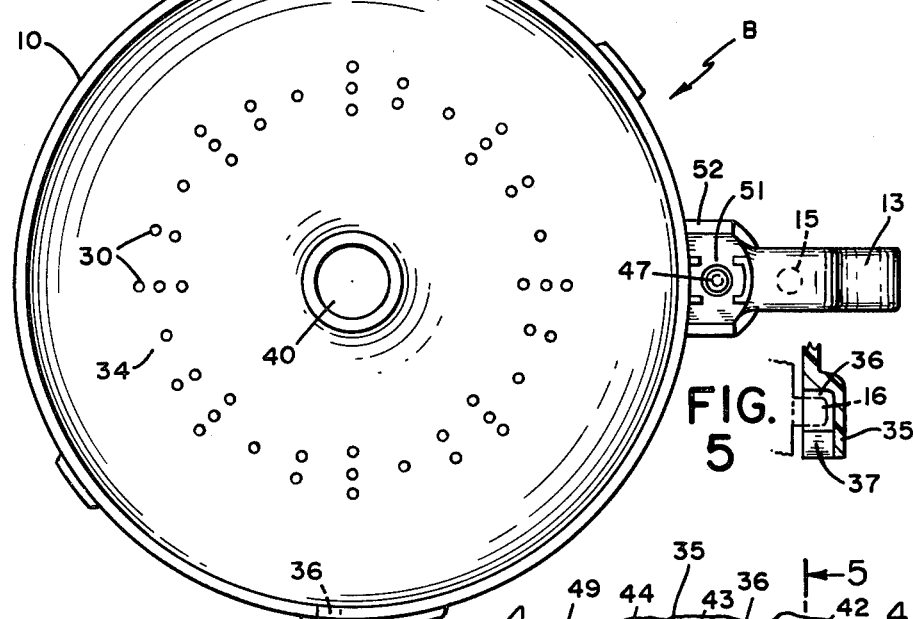
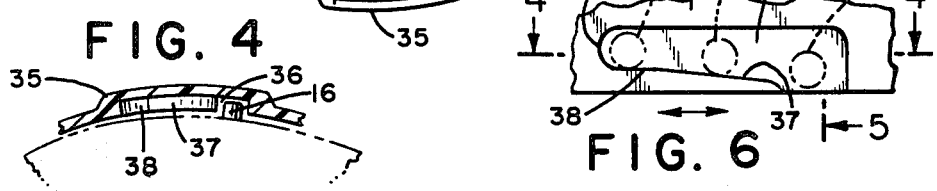
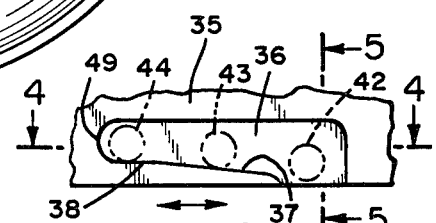

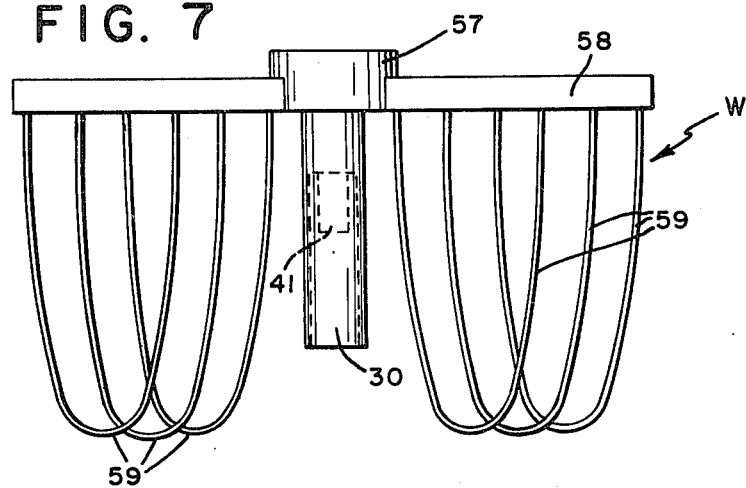
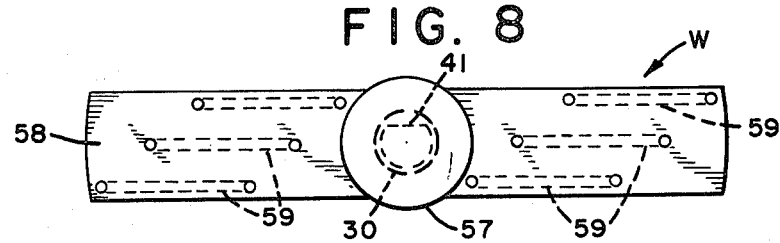
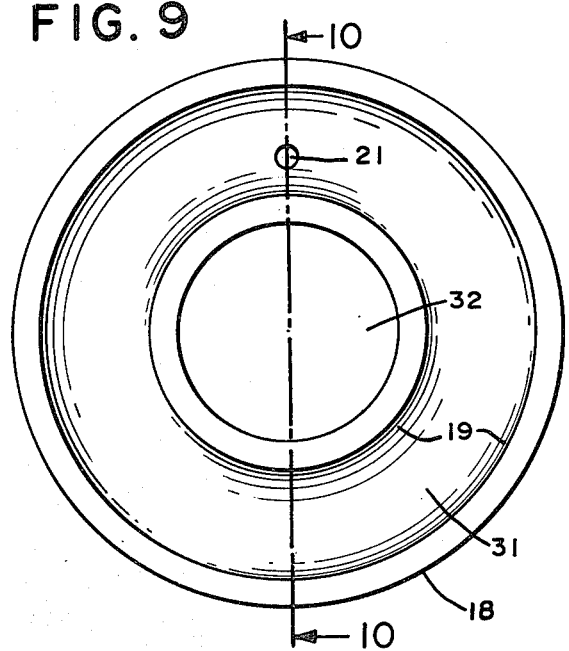
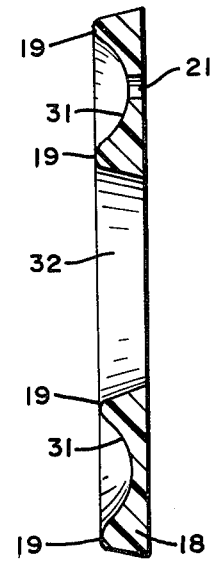

FOOD PROCESSOR WITH AIR WHIPPING CAPABILITY

BACKGROUND OF THE INVENTION

1. Field of the Invention

This invention relates to an improved food processor kitchen appliance which possesses the added capability of whipping cream, egg whites, and the like.

The use of food processors has attained surprisingly wide usage in a relatively short span of years. Devices of this kind, of which there are many brands on the market, are admirably capable of rapidly and effectively performing a wide range of food preparation functions including slicing, shredding, chopping, kneading, mincing and the like. Also, while attempts have been made to whip food products such as cream or egg whites in food processors, no food processor is known which can effectively perform the whipping function in a manner that yields a high volume product of uniform consistency and/or which does not adversely degrade the food product such as occurs when the liquid food is overwhipped.

2. Description of the Prior Art

Heretofore, the whipping of liquid food products to produce, for example, whipped cream or meringue, has been prepared by conventional stirring mechanisms or beaters, most frequently an electric or hand beater. Careful attention has been required to obtain a superior product. Such prior art means have involved a relatively tedious process and have yielded a product which is often less than optimum, i.e., the product is often either overwhipped, resulting in a partially degraded product, or the product is underwhipped, resulting in a relatively low yield having a "heavy" rather than "fluffy" texture. In both cases, the resulting whipped food product is frequently substantially inferior to the desired optimum product.

Attempts have also been made to use a standard commercially available food processor to prepare whipped cream and/or egg white, etc. However, such efforts have not met with significant success. To a large extent, the inability to produce whipped food products in a conventional type food processor, presently in use in the home or commercial kitchen, is due to the incapability of presently available blades to introduce air into the food product as it rotates, and also to the high rate of rotation of the mixing blades which causes degradation of the whipped food product. All past efforts to overcome these deficiencies have not met with significant success. Consequently, no food processor is known which has the capability of producing a high volume whipped food product having a consistently uniform texture and which, by its manner of functioning, can effectively whip cream or egg whites without overwhipping the product.

It is thus apparent that a need exists for a food processor, with the capability of producing a whipped food, such as whipped cream and meringue, which consistently produces a high volume product and which avoids the degrading effect of overwhipping.

SUMMARY OF THE INVENTION

The present invention provides a food processor with the added capability of preparing a superior whipped food product such as whipped cream, meringue, and the like. The food processor of the invention in essence comprises the usual features of a food processor which include a base, which houses a motor to drive the rotating accessories, i.e., discs, etc., a bowl that fits onto the base to contain the food to be processed, and a cover for the bowl with a feed tube incorporated in the cover. The processor is furnished with a plurality of blades, accessories and attachments to effect various functions such as slicing, grating, mincing, chopping, blending, kneading, and the like. The improved food processor of the invention affords, in addition, a food whipping capability. The essence of the improvement of the invention resides in; a special bowl, sometimes referred to as an air bowl, which may be readily substituted for the conventional bowl and into which low pressure air may be admitted; means to supply a source of air to be fed into the bowl through the bottom of the bowl; means for controlling the stirring whisk attachment mixing speed; and means for monitoring the admittance of air into the food product to be whipped. The act of placement of the air bowl on the base functions to control suitable electrical switches which in turn control devices which alter gear ratios between the drive motor and the drive shaft to a lower than conventional gear ratio, thereby reducing the rotational speed for the food whipping cycle. At the same time, the gear train between the drive motor and the air pump is engaged, resulting in providing a supply of air into a chamber beneath the bowl and thence into the bowl through holes formed in the bottom of the bowl. Suitable controls for manually or automatically starting and stopping or interrupting the air feed and/or stirring whisk are provided to allow whipping action to be started or stopped in a variety of desired performance cycles. The automatic control may incorporate and include a timing device as an optional program feature.

BRIEF DESCRIPTION OF THE DRAWING

FIG. 2 is an elevational view in cross section of the food processor bowl of the invention.

FIG. 3 is a plan view of the bowl of FIG. 2.

FIG. 4 is a plan view taken along line 4—4 of FIG. 6 of the locking means to effect a seal between the bowl and the chamber gasket positioned on the base or housing below the bowl.

FIG. 5 is a end view of the locking means of FIG. 4 taken along line 5—5 of FIG. 6.

FIG. 6 is a side view of a detail of the locking mechanism of FIG. 4.

FIG. 7 is an elevational view of a preferred form of stirring whisk or whipping element.

FIG. 8 is a plan view of the stirrer of FIG. 7.

FIG. 9 is a plan view of one form of an air chamber on which the bowl is locked into position.

FIG. 10 is a cross sectional view of the air chamber taken along line 10—10 of FIG. 9.

DETAILED DESCRIPTION OF THE PREFERRED EMBODIMENT

Figure 1:
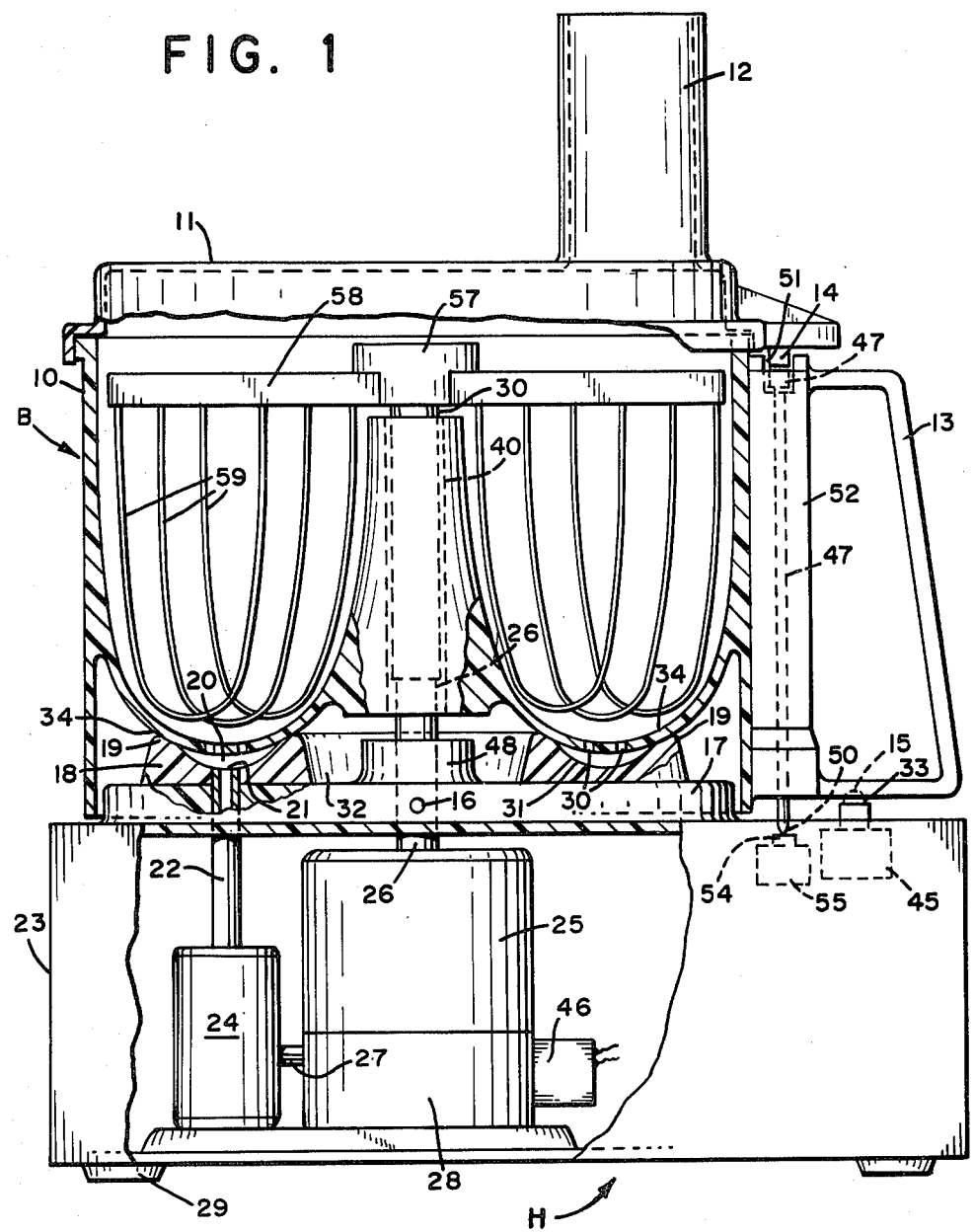
FIG. 1 is a side elevation schematic partially cutaway of a food processor which embodies the essential elements of the invention.

The various brands of food processors which are available for use in the home or commercial kitchen, provide an invaluable multifunctioned kitchen aid. Food processors are able to quickly slice, chop, mix, knead, mince, or juice fruits, etc., during food preparation. However, the one operation that food processors are unable to successfully perform, and which is a highly desired and important function in the preparation of various foods, is the ability to produce a high volume whipped cream or whipped egg whites. The improved food processor of the invention allows for using either a conventional type food processing bowl or a liquid food whipping bowl, also called an "air bowl". Both the air bowl and the conventional bowl are interchangable and the choice of either would depend upon which kind of food preparation is desired. The food processor of this invention has, in addition to the processing blade and disc drive motor, which are a part of the conventional food processor, a low pressure air pump. This air pump may be driven by the same drive motor which operates the conventional food processor. This may be effected by placing the interchangable liquid food whipping bowl on the machine. The action of placing the air bowl upon the machine, using appropriately formed interconnecting elements, will cause the gear ratio between the drive motor and the processing blade shaft to change to a lower ratio, thus reducing the processing blade shaft rotational speed. At the same time, the gear train between the drive motor and the air pump will be engaged or connected, causing the air pump to supply air to the whipping bowl. The gear ratios chosen, will cause both the air pump and the processing blade shaft, to be driven at rotational speeds appropriate for the whipping function, i.e., the shaft will turn at the proper speed required for the whisk implement to optimally whip cream or egg whites.

When the conventional type food processor bowl is placed upon the machine, the gear train will automatically disengage itself between the drive motor and the air pump, and at the same time, the gear ratio between the drive motor and the processing blade shaft, will return back to the relatively high rotational speed required for conventional food processing operation. It will be apparent however, that a separate motor with suitable related switches, may be used for operating the air pump in addition to the drive motor which provides the rotational action for the food processor.

Referring to FIG. 1, a partial cross sectional view of a food processor which embodies the whipping capabilities in accordance with the invention, is shown. The unit differs from a conventional food processor in that it is modified to enable it to utilize an air bowl whipping accessory with its attachments, for the purpose of converting liquid foods such as cream or egg whites into a high volume whipped cream or whipped egg white product.

A detailed description of the component parts and the manner of functioning of the air whipping arrangement follows. The air bowl, shown generally as B, is fabricated so as to be interchangable with a conventional type food processor bowl (not shown). The air bowl, when it is substituted for the conventional bowl, is positioned and locked in place upon the bowl base support 17 formed on the food processor base 23 when a whipped food such as cream or egg white is to be prepared. As with the ordinary type bowl of conventional food processors, after the air bowl B is placed upon the food processor bowl base 17 formed on the base housing H (and taking care that the bowl locking pins 16 are engaged in the slots 36 at the base of the bowl, i.e., at position 42 of FIG. 6), the bowl is rotated to the right for a short distance. This rotational action causes the bowl to be forced downward by pins 16 as they slide against the inclined plane 37 (best shown at position 43 in FIG. 6) until the bottom curved portion 34 of the air bowl (best shown in FIG. 1) is pressed tightly against the resiliant gasket 18. When this happens, the high portions 19 of gasket 18 will form an airtight seal with the curved portion of the bowl 34 (best shown in FIG. 1). The air bowl is rotated fully on base 17 until pin 16 is at position 44 and abuts the end of slot 49 shown in FIG. 6. At this point, pin 16 is resting on the flattened portion 38 of the inclined plane where pin 16 strikes the end of slot 36 at point 49 and the bowl is properly positioned for use. Also, in this operational position of bowl 10 on base 17, the bottom of the handle 13 at point 15 will depress actuator 33 of switch 45 thereby causing it to supply electrical power to solenoid 46 attached to gear box 28 of drive motor 25. This operational mode will occur only after the bowl cover 11 is placed on top of air bowl 10 and rotated to its normal locking position as occurs when the appliance is used with a conventional type food processing bowl. The rotational action of the cover on the bowl causes the inclined ramp 14 located in top of bowl cover 11 to force down the upper part of the captive switch actuating rod 47 so that its lower end 50 presses down on the switch actuator 54 of power switch 55. When power switch 55 is energized, it will supply electrical power to drive motor 25 and also to switch 45, which in turn, when it is actuated to its ON position by the air bowl handle at 15, will then supply power to the solenoid 46 which is mounted on the gear box 28 of drive motor 25. The energization of the solenoid 46 causes the gear ratio within the gear box 28 between the drive motor 25 and the drive shaft 26 of FIG. 1 to change over to a slower rotational speed as required by the whisk when whipping liquid foods. In addition, the energization of solenoid 46 will also cause the air pump 24 to be coupled to the gear train through its shaft 27, thus providing a supply of air which is required when liquid foods are to be whipped. The details of the action of the energized solenoid in shifting gear ratios between the motor 25 and the turning shaft 26, and engaging or disengaging the shaft 27 connected to the air pump, such as for example, the Series 700 non-metallic pumps which are manufactured by Dynatrol Industries, Inc., Stamford, Conn., is known, and may readily be effected by those skilled in the art.

Referring again to FIG. 1, after the air bowl 10 is placed upon its base 17 and turned to its locking position 44 shown in FIG. 6, The whisk assembly W, illustrated in FIG. 7, is placed onto the drive shaft 26 shown in FIG. 1 though the hole 40 at the center of bowl B. The inside of the whisk shaft 30 of FIGS. 7 and 8 has a flat 41 which is keyed and fits against a similar and matching flat (not shown) on the drive shaft 26 shown in FIG. 1, so that the whisk will be rotated by the turning shaft without slippage.

The whisk W comprises a horizontal bar 58 formed with a central knob 57 from which a vertical mounting cylinder 30 depends. The latter is mounted on the shaft 26. A plurality of parallel mounted wire stirring members 59 are secured to and depend from bar 58. Handle 13 on the air bowl is formed so that only the air bowl will activate switch 45 at point 15. The conventional food processing bowl handle, at its bottom portion, will not engage the actuator 33 on switch 45, and therefore, the switch will not supply power to solenoid 46. As a result, the drive shaft 26 rotation will turn at its normal speed for food processing operation (other than for whipping). Also, the shaft 27 of the air pump will not be engaged and coupled to the gear train. Thus, no air will be produced during the conventional (non whipping)

functioning of the food processor. When the food processor is to be used to whip cream or egg whites, the air bowl 10 is placed upon bowl base 17 of the food processor shown in FIG. 1, and the bowl 10 is turned to the right side as viewed from the front of the machine (counter clockwise looking down from above) until pins 16 have pulled down the bowl against the gasket 18, and it is locked into position. When the air bowl is in this position, the top part of the switch actuator 33 of switch 45 will move up into the recessed hole 15 of handle 13, thus preventing the bowl from accidently turning and unsealing itself against the resiliant gasket 18. Next, the shaft 30 of the whisk is placed into the hole 40 at the center of the air bowl 10 so tht its internal shaft flat 41 shown in FIG. 7 coincides with the flat (not shown) on the upper part of the drive shaft 26. The bowl cover 11 is then placed over the top of the air bowl B but is not rotated in a counter clockwise direction (looking down from above) as yet. In this position, the power to the food processor has not been turned on and the machine is not operating as yet. Next, the lid 11 of the air bowl is moved to the right (counter clockwise rotation looking down from above) causing the machine to be turned on and operate. The whisk will rotate at a relatively slow speed, e.g., within a range of 150 to 300 RPM (revolutions per minute) while at the same time, the air supply will also begin to operate and produce the required amount of air pressure and air volume needed for whipping liquid foods such as cream or egg whites. Once the food processor has begun to operate in this manner, the liquid food to be whipped, will then be poured into the feed tube 12 of the bowl lid 11 shown in FIG. 1. As with conventional food processor operation, the machine can be started or stopped by rotating the bowl cover 11 either in a counter clockwise direction to start it, or in a clockwise direction to stop it (looking down at the lid from above), or by means of an OFF-ON power switch. Thus, the whipping action can be started or stopped as desired. Switch actuating rod 47 and power safety switch 55 are of a kind that are built into conventional food processors. In addition to the above safety switch 55 and switch actuating rod 47 combination, the food processor may also include a manual OFF-ON power switch which is also controlled or energized by the safety switch 55 so that it is possible to secure the bowl lid 11 tightly onto the bowl 10 without causing the food processor to be turned on. In this case, once the bowl cover 11 is secured to the bowl 10 by turning the cover counter clockwise, the machine may then be turned on and operated by manually switching the panel mounted power switch to its ON position. Once the food processor has been put into operation in this manner, it may then be stopped from operating by either turning the bowl lid 11 to its clockwise position (looking down from above) as for lid removal from the bowl, or by leaving the lid in its counter clockwise position on the bowl and locked, and then turning the food processor off by means of the manually operated power switch which is mounted on a panel or on the base of the machine. Rotating the bowl cover 11 to the left or right, will cause the switch actuating rod 47 in handle 13 to either move up or down depending upon the cover position. Thus, when the bowl lid is rotated a short distance to the left (in a counter clockwise direction looking down from above), switch actuating rod 47 will move upwards, causing switch 55 to become de-energized, thereby turning off the power to the machine. The bowl cover 11 when in this position, can then be lifted off and removed from the bowl, and the texture, of the whipped food product in the bowl, examined. If after examination, it is determined that the whipped food requires additional whipping to improve its texture, the lid 11 of the bowl can be returned to its position on top of the bowl and then turned in a counter clockwise direction (when viewed from the top) in order to start up the food processor again. When whipping of the food is completed, the cover 11 of the bowl is again turned to the left (clockwise direction when viewed from the top) and then removed from the bowl. Operation of the food processor will cease as the power to it is turned off either with the manual switch or by a clockwise rotation of the lid 11 (viewed from above). The whisk may then be removed by lifting it out of the bowl when the lid is removed, by grasping whisk knob 57. The air bowl B by twisting it to the left side (clockwise direction looking down from above) until pins 16 are disengaged from slots 36, can then be lifted off bowl base 17 of the food processor, and the whipped food contained therein removed.

Shown in FIGS. 2 and 3 is a concave or dimpled recessed small shallow hole 15 which is located at the lower portion of handle 13. This concave recess, when it is positioned above the switch 45 at the rounded top end of its actuator shaft 33, not only serves to depress this actuating shaft into the switch causing it to energize the solenoid 46, but recess 15 into which the actuating shaft 33 fits, also serves to act as a detent to prevent the bowl from accidently rotating off the switch actuator shaft 33, thereby causing switch 45 to become de-energized. However, when the bowl is intentionally rotated so that it can be removed from the food processor base, the rotating action of the bowl will move the lower portion of handle 13 away from switch actuator shaft 33, thereby de-energizing switch 45, and as a result, de-energizing solenoid 46. The handle 13 of the alternate, i.e., the conventional food processing bowl not used for whipping liquid foods, is formed such that its lower portion will pass high enough above the switch actuating shaft 33 so that switch 45 will never be activated and turned on by this handle when it is in its operating position for food processing, and as a result, no air will be forthcoming from the air supply. Likewise, the bottom portion of the conventional food processing bowl is formed such that when it is in its operating position for food processing, its bottom will be high enough so as to clear the raised portions 19 of gasket 18, since the formation of an air chamber 20 is not required for conventional food processing operation. In using the processor for conventional food processing operation other than for whipping, all that is required is that a food processor mixing bowl of a conventional kind be placed upon the food processor bowl base 17. When the conventional food processor bowl is used, handle 13 is designed such that its lower part will clear switch actuator 33 of switch 45 when the bowl is turned to its counter clockwise position for operation. Thus, switch 45 will not be energized and, as a result, the food processor drive shaft 26 will rotate at a relatively rapid speed that is normally used for conventional food processing. Because switch 45 is not activated, the air generating means will not operate to supply air to the appliance.

The passage of air flow used in whipping the food in the appliance of the invention is shown by reference to FIG. 1. The output of air from the air supply 24 flows into the air tube 22 and then upwards into the opening hole 21 located at the central covcave portion of gasket 31 (also shown in FIG. 9). The cross sectional assembly drawing (FIG. 1) shows how an air chamber 20 is formed when the two raised portions 19 of gasket 18 are pressed against the curved portions 34 of the air bowl 10. This air chamber 20 curves around in a circular manner, centrally located within the concave region 31 of the pliable gasket 18, and comprises the valley between the peaked portions 19 of the top side of gasket 18, shown in both FIG. 1 and FIG. 9. The air chamber 20 is confined on its lower side by the concave portion 31 of gasket 18, and on its upper side by the curved portion 34 of the bottom of the air bowl 10, and on each side by the raised portion 19 of the pliable gasket 18. At the center of gasket 18 is a clearance hole 32 to allow the drive shaft support 48 to pass through it. Air from the air supply means 24 is introduced into the air chamber 20 through the air outlet hole 21 of air tube 22.

The air bowl 10 has at its bottom curved portion 34, as shown in FIGS. 1, 2, and 3, a circular grouping of small holes 30 formed through it that have diameters of approximately 0.04 inch to 0.06 inch. The function of these small holes 30 is to allow air to pass through into the bowl from the air chamber 20 and then to be entrained in the liquid cream or egg whites to produce the whipped liquid food product. The small size of the holes coupled with the flow of air passing through them, serves to prevent the liquid food within the bowl, from flowing out of the bowl through these holes. The air whipping of food, together with various comparisons, is described in greater detail in my copending patent application Ser. No. 261,310 filed May 7, 1981 entitled Liquid Food Whipping Appliance.

The aerating whipping appliance of the invention is now described when used in the food whipping mode, using cream as an example. As the liquid cream is aerated, bubbles will form in the cream which are comparatively large in size. The action of the revolving whisk 58 is such that the wire portions 59 of the whisk will pass through the bubbling liquid cream, thereby breaking them down into smaller bubbles. The whisk may revolve at a relatively slow speed, e.g., of between about 150 to 300 RPM (revolutions per minute). This slow rate of stirring action of the whisk, will not cause the cream particles to be sheared or degraded, or to be broken down to form butter as is frequently the case with more violent mechanical agitations. Also, because of the relatively slot stirring speed of the whisk, this air whipping process will not cause splattering within the bowl. As the wire members 59 of the whisk moves through and stirs the cream, the size of the bubbles in the liquid will become smaller in size and multiply in number until a uniform textured foam results. When the cream thus whipped (or egg whites) appears to be of the desired texture and firmness, the lid 11 of the bowl is then removed by twisting it to the left side (clockwise direction when viewed from above) thereby stopping both the stirring and aeration process to the whipped food product. The bowl lid 11 is removed from the bowl and the whisk W is then lifted out of the bowl 10 by grasping the whisk knob 57 and lifting it up and out. The air bowl 10 is then held by handle 13 and twisted to the left (clockwise direction looking down from above) so that it becomes disengaged from pins 16 at its base portion 35, and is then lifted off from the bowl base support 17.

It will be apparent that various modifications may be effected in the food processor, which provides the particular capability of producing a whipped product without departing from the scope of the invention. In some instances, for example, the implement drive motor may have its drive shaft directly coupled to its rotating member, rather than coupled through a gear train. In such a case, the drive shaft rotational speed may be changed from one rotational speed to another by electrically controlling the speed of the motor, rather than by changing the gear train ratios. Electrically controlling the speed of a suitable electrical motor is well known to one skilled in the art. The several details disclosed in presenting the invention and its advantages, are not to be construed as placing limitations on the invention except as required by the appended claims.

What is claimed is:

1. In a food processor comprising a base which houses a drive motor, a removable bowl which is mounted on said base for containing the food, a removable cover for said bowl, and a rotatable element mounted on an implement drive shaft which passes through the center of said bowl and is rotated by said motor, the improvement comprising:
   (a) modifying said base so that it accomodates a modified bowl, said modified bowl being provided with a plurality of small holes through the bottom of the bowl to admit air into the bowl,
   (b) a source of air on said base to supply air to said bowl,
   (c) means to supply air to said bowl from said air source when said bowl is positioned on the base,
   (d) a whisk element positioned in, and extending to the bottom of the bowl and means to rotate said whisk as air is being admitted to said bowl.

2. The food processor of claim 1 in which the implement drive shaft is geared downward to a lower rotational speed by interconnecting means on said bowl when said bowl is positioned on said base.

3. The food processor of claims 1 and 2 in which means, contained on said bowl, is used to activate the air supply means as said bowl is located in operating position.

4. The food processor of claim 1 wherein the whisk element (d) comprises a horizontal rotatable bar provided with a central mounting shaft and a plurality of parallel mounted wire mixing elements depending on both sides from said bar.

5. The food processor of any of claims 1, 2 and 4 in which said means to supply air comprises an open chamber formed on the base wherein said chamber is converted to a confined enclosure by the bottom of the bowl when the bowl is positioned on the chamber and into which air is introduced from said air supply means.

6. The food processor of claim 5 wherein said chamber comprises a resiliant gasket having a concave cross section and upon which the bowl is positioned to provide the confined enclosure.

7. The food processor of any of claims 1, 2 and 4 provided with a first electrical bowl interlock which activates the rotatable motor when a bowl is in position and a second electrical bowl interlock which activates an air supply only when a bowl which admits air through the bottom is positioned on the base.

8. A food processor comprising a base which houses a drive motor, a bowl mountable on said base for containing food, a removable bowl cover, and a rotatable element mounted on a shaft which passes through the center of the bowl and is rotated by said motor, said bowl being provided with a plurality of small holes through the bottom of the bowl to admit air into the bowl, a source of air positioned to feed air through said small holes in the bottom of the bowl when said bowl is placed on the base, electrical interconnect means to activate the drive motor when a bowl is positioned on said base, second electrical interconnect means on the bowl to activate the air supply means and a whisk element positioned in, and extending to the bottom of, said bowl and a means to rotate said whisk as air is being admitted to said bowl.

9. The food processor of claim 8 in which said means to supply air comprises an open chamber formed on the base and wherein said chamber is converted to a confined enclosure by the bottom of the bowl when the bowl is positioned on the chamber and into which air is introduced from said air supply means.

* * * * *